Sept. 10, 1935.  J. W. TATTER  2,014,362
CLUTCH
Filed March 12, 1931  4 Sheets-Sheet 1
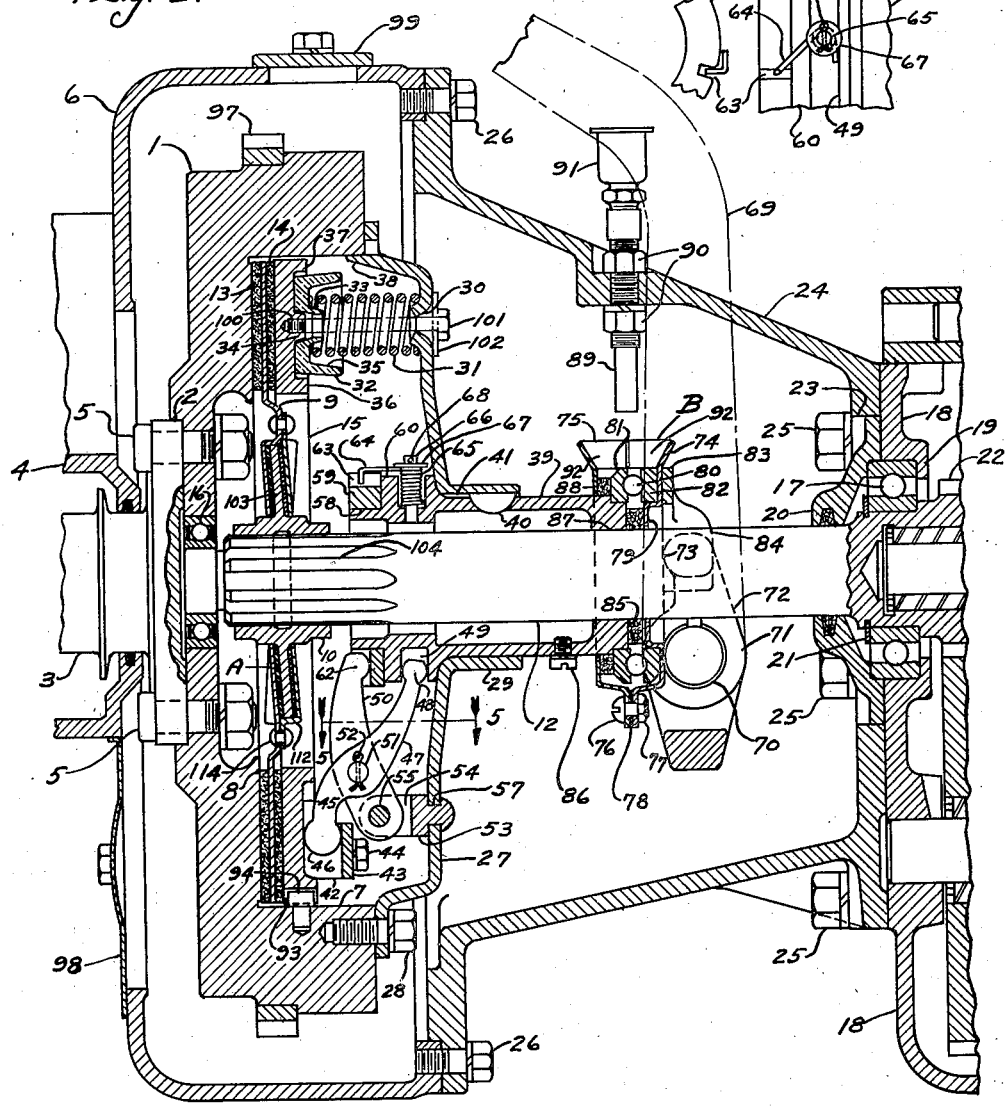
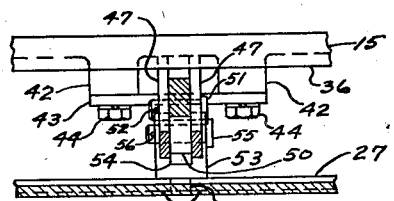
INVENTOR.
John W. Tatter
BY
George B. Ingersoll
ATTORNEY.

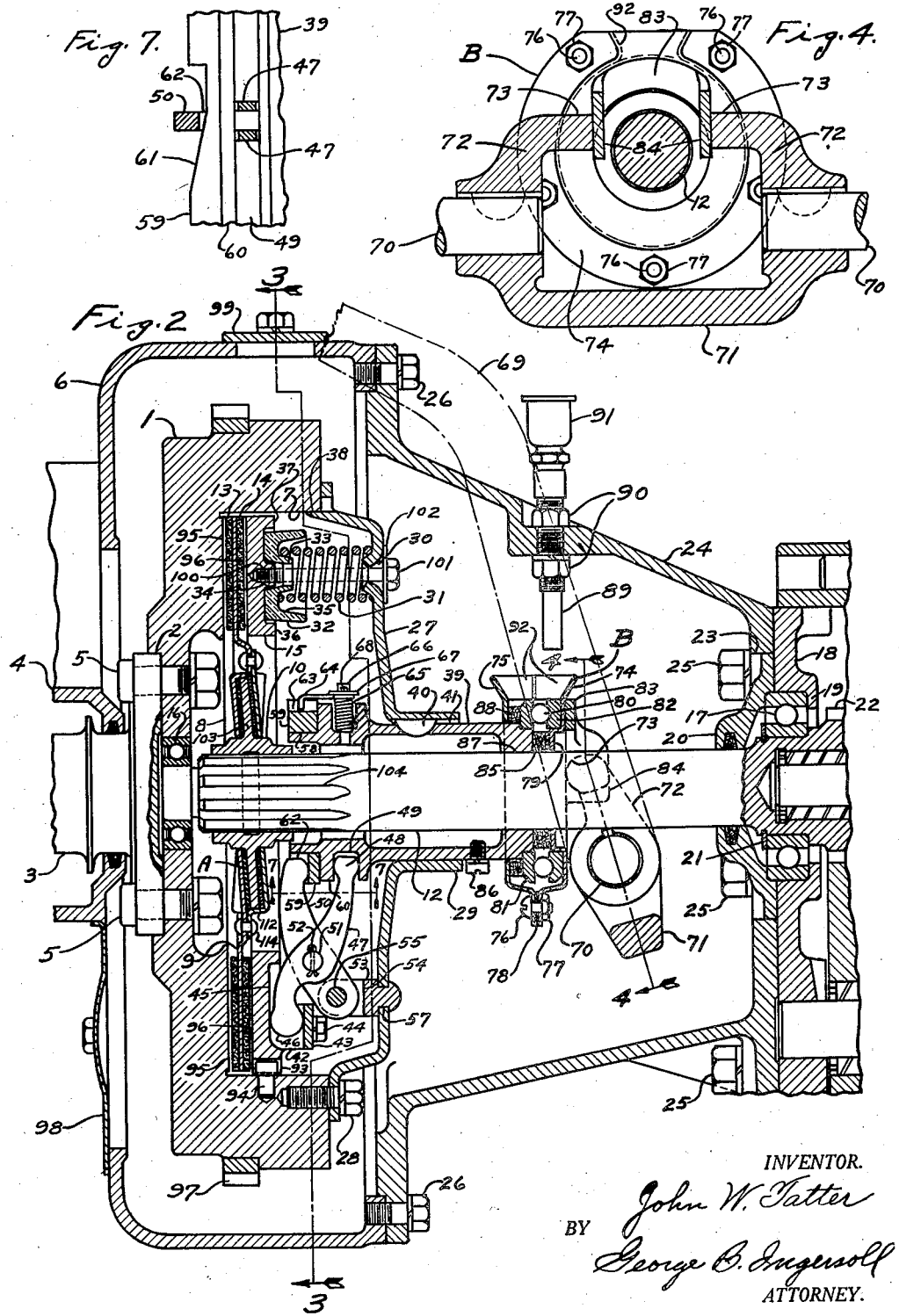

Sept. 10, 1935.   J. W. TATTER   2,014,362
CLUTCH
Filed March 12, 1931   4 Sheets-Sheet 3

INVENTOR.
John W. Tatter
BY
George B. Ingersoll
ATTORNEY.

Sept. 10, 1935.  J. W. TATTER  2,014,362
CLUTCH
Filed March 12, 1931   4 Sheets-Sheet 4
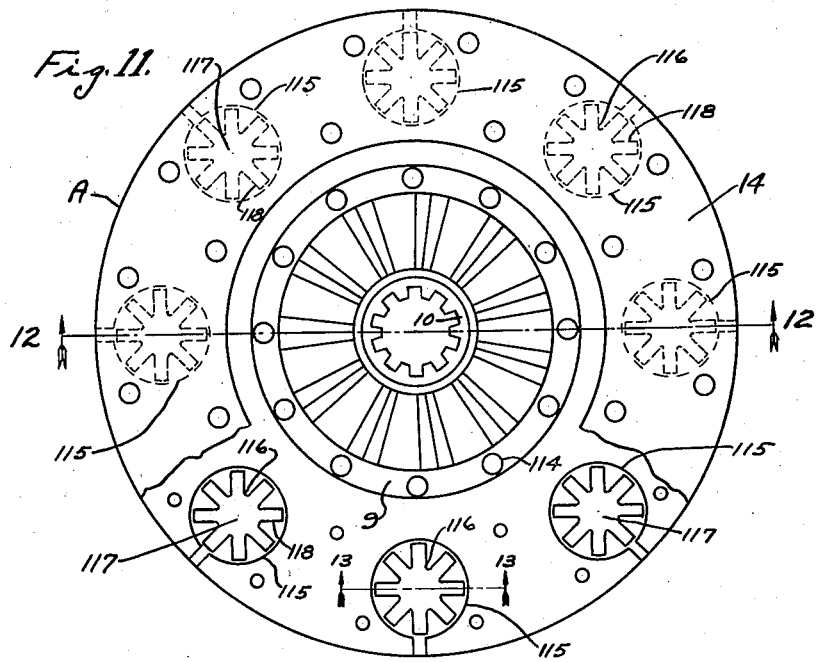
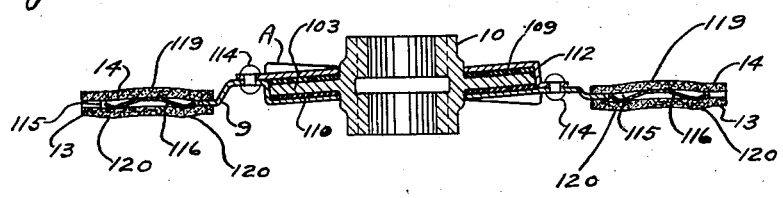
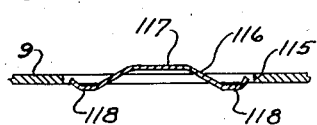
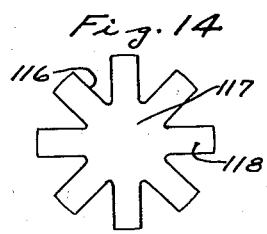
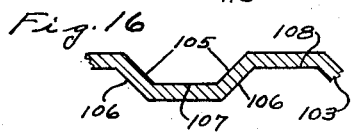
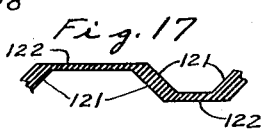
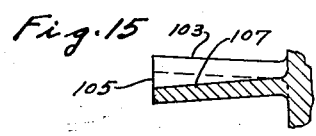
INVENTOR.
John W. Tatter
BY George B. Ingersoll.
ATTORNEY.

Patented Sept. 10, 1935

2,014,362

UNITED STATES PATENT OFFICE 2,014,362

CLUTCH

John W. Tatter, Detroit, Mich.

Application March 12, 1931, Serial No. 521,933

20 Claims. (Cl. 192—68)

My invention relates to improvements in clutches incorporating vibration dampening means, and the objects of my improvements are, first, to provide a vibration dampening member provided with converging angular positioned load receiving surfaces restrained from flowing radially outwardly; second, to provide a vibration dampening member having no apertures through its frictional contact surfaces; third, to provide a vibration dampening member having a single aperture only therethrough; fourth, to provide a vibration dampening member having containing means secured solely outside of the peripheral portions of said vibration dampening member; and sixth, to provide a vibration dampening member having angular surfaces having a greater cross sectional area than portions for connecting said angular surfaces.

I attain these objects by the mechanism illustrated in the accompanying drawings, in which—

Figure 9:
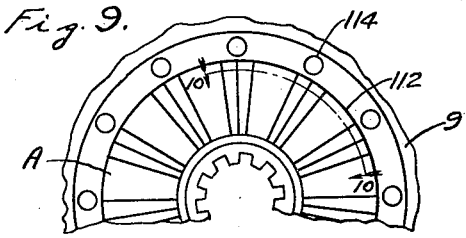
Figure 10:
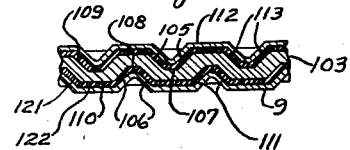
Figure 3:
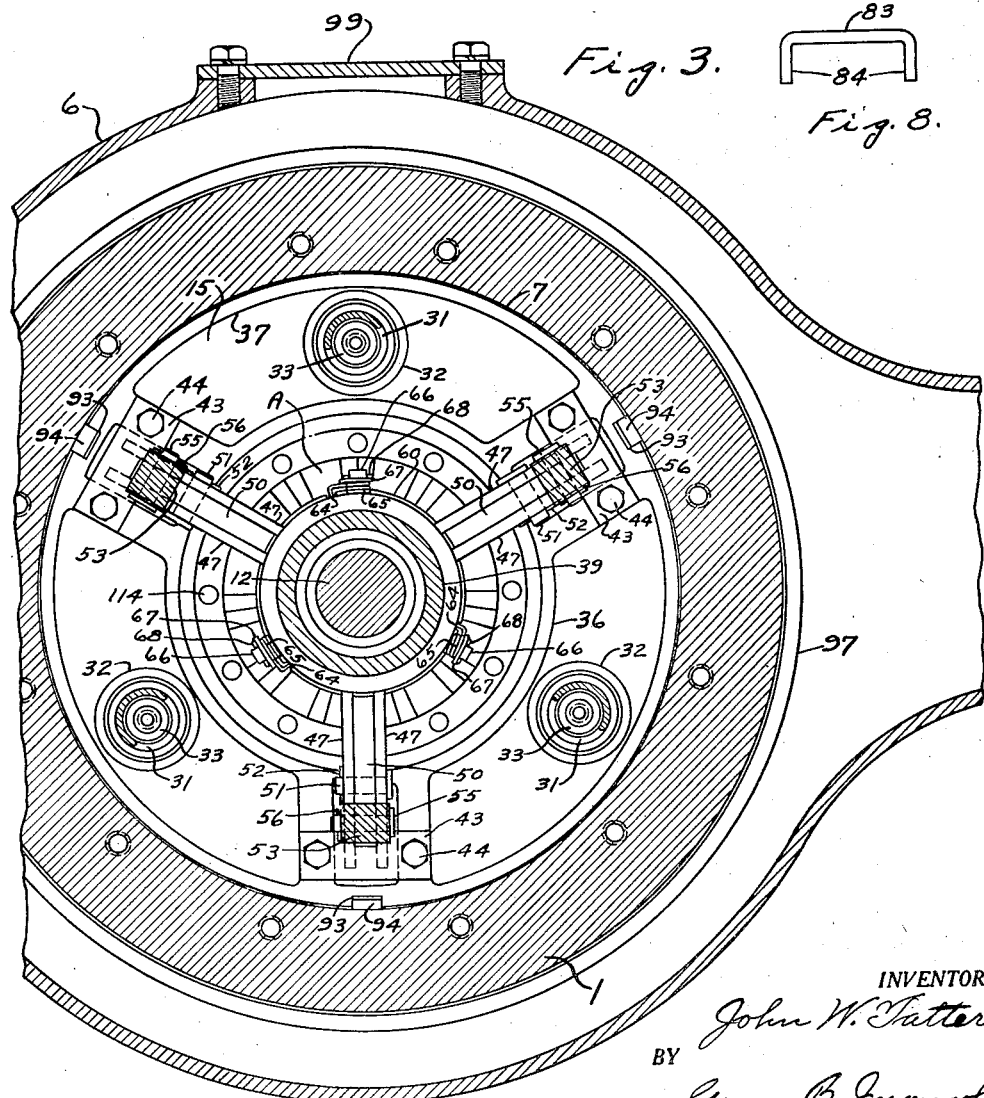
Figure 8:
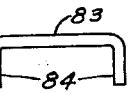

Figure 1 is a sectional view of the clutch assembly within a flywheel of a motor, together with its enclosing housings, said view disclosing the clutch members in their engaged position; Fig. 2, a sectional view of the clutch assembly within the flywheel of a motor, together with its enclosing housings, said view disclosing the clutch in its disengaged position; Fig. 3, a sectional view of the clutch assembly, said sectional view being taken on the line 3—3, Fig. 2; Fig. 4, a sectional view of the rear end elevation of the clutch throwout mechanism being taken on the line 4—4, Fig. 2; Fig. 5, a partial sectional view taken on the line 5—5, Fig. 1; Fig. 6, a partial elevation of the push type operating sleeve and cam member together with one of the cam member operating springs; Fig. 7, a partial sectional view taken on the line 7—7, Fig. 2; Fig. 8, a plan elevation of the lubricant reservoir locking member; Fig. 9, a partial rear elevation of the hub portion of the vibration dampening driven plate assembly; Fig. 10, a sectional view of the vibration dampening driven plate, being developed on the line 10—10, Fig. 9; Fig. 11, a rear elevation of the complete driven plate assembly, together with its members for permitting easy and gradual engagement thereof; Fig. 12, a sectional view of a driven assembly taken on the line 12—12, Fig. 11; Fig. 13, a partial sectional view of the driven plate assembly through one of its members which permit easy and gradual engagement of the driven plate, said view being taken on the line 13—13, Fig. 11; Fig. 14, a front elevation of one of the easy and gradual engaging members of the driven plate assembly; Fig. 15 a partial sectional view of one of the angular surface portions of the flanged hub; Fig. 16, a partial plan elevation of one of the angular surface portions of the flanged hub and, Fig. 17, a partial plan elevation of one of the vibration dampening members disclosing its angular contact surfaces.

Similar numerals refer to similar parts throughout the several views.

The flywheel 1 is mounted on the flange 2 of a crankshaft 3 of an engine, supported in the crank case 4. The flywheel 1 is held onto the flange 2 by the bolts 5. The crank case 4 is provided with a bell housing 6 in which the flywheel 1 revolves. The flywheel 1 is provided with the chamber 7, together with the friction face 8. The driven member assembly A comprises the friction disc 9 which is fastened, as hereinafter described, to the hub 10, the hub 10 being suitably mounted on the splines of the shaft 12. The friction members 13 and 14 may be suitably fastened to the friction disc 9, the friction member 13 being disposed between the friction face 8 of the flywheel 1 and the face of the friction disc 9. The friction member 14 is similarly disposed between the friction disc 9 and the thrust member 15. The shaft 12 is supported at its front end in the bearing assembly 16, which is mounted in a recess of the flywheel 1, and at its rear end in the bearing assembly 17, which is mounted in the transmission housing 18.

The bearing assembly 17 is maintained by the shoulder 19 of the transmission housing 18 and also by the retainer 20, which is suitably fastened to the transmission housing 18. The bearing assembly 17 is further retained on the shaft 12 by the retainer member 21, the shaft 12 incorporating the gear member 22, as similarly used in the usual type of transmission. The retainer 20 may be piloted in the bore 23 of the clutch housing 24, the clutch housing being suitably fastened to the transmission housing 18 by the screws 25. The clutch housing 24 is fastened to the rear face of the bell housing 6 by the screws 26.

The cover member 27 is fastened to the rear face of the flywheel by the screws 28, the cover member 27 being provided with an extension portion 29. The cover member 27 is provided with a series of depressed portions 30, which fit within and locate one end of the springs 31, which are thus supported against the cover member 27 and exert a thrust against the baffle members 32. The baffle members 32 are each provided with the boss 33, which locates the spring 31 at its forward end. The baffle member 32 is located by loosely fitting over the boss 34 of the thrust member 15. The boss 34 may have tapered sides to provide for economical manufacturing, the tapered sides of the boss 34 fitting within similar tapered holes in the recess in the boss 33 of the baffle member 32. It is to be noted that the baffle member 32 has its outer wall portion so located as to provide an enlarged recess portion 35 around the inner end of the spring 31. The recess portion 35 has its inner wall surfaces located away from the inner end of the spring 31, the walls of the recess portion 35 extending outwardly from the thrust member 15 to provide a member for baffling the heat generated in the thrust member 15 away from the springs 31. To further prevent the heat, which will be developed in the thrust member by the operation of the clutch, from being conducted into the spring 31, the baffle member 32 is constructed of insulator material, such as asbestos composition material, having a very low coefficient of heat conductivity. It will thus be noted that the heat which is generated in the thrust member 15 will be unable to be conducted through the baffle member 32 to the spring 31 and also the baffle member 32 will further protect, by its walls surrounding the recess portion 35, the spring 31 from receiving radiant heat directly onto the coils of the spring 31. This construction will provide means for eliminating the breaking down of the springs 31 due to the radiated and conducted heat from the thrust member 15 which constitutes a great weakness of design in the usual type of clutch assembly incorporating thrust springs of this type located in close proximity to the clutch thrust members. The thrust member 15 is provided with the extension portion 36 at its inner edge and the extension portion 37 at its outer edge, which provide added strength for resisting thrust reactions. The cover member 27 is provided with a series of projections 38 which may be used for piloting the cover member 27 into the chamber 7 of the flywheel 1. The projections 38 may be formed by making suitable openings in the cover member 27 and displacing the metal of the openings to provide the extensions 38 at the proper point for piloting purposes, the outer surface of the projections 38 being suitably finished to pilot dimensions. The sleeve member 39 is slidably mounted in the extension portion 29 of the cover member and is restrained from turning therein by the key 40, the key 40 engaging the keyway 41 of the extension portion 29 together with the sleeve member 39. The thrust member 15 is further provided with the bosses 42 to which are fastened the plates 43 by the screws 44. Between the bosses 42 and the surface 45 of the thrust member 15, together with the plates 43, a chamber will be provided for receiving the outer ends 46 of the levers 47. The levers 47 are provided at their inner portions with the ends 48 for engaging the groove 49 of the sleeve member 39. The levers 47 are assembled on each side of the lever 50, the lever 50 being pivotally mounted on the pin 51, which is supported in the levers 47, the pin 51 being retained by the cotter pin 52. The yoke members 53 are each provided with grooves 54 in which are mounted the levers 50, the levers 50 being retained therein by the pins 55, the pins 55 being retained by the cotter pins 56. The yoke members 53 may be provided with portions 57 for riveting to the cover member 27, the portions 57 having a rectangular shape to prevent turning in the cover member 27. The sleeve 39 is provided at its forward end with the surface 58 on which is rotatably mounted the adjusting member 59, which also engages the forward face of the shoulder 60 of the sleeve 39. The adjusting member 59 is provided with the bevel faces 61, which are clearly shown in Fig. 7, the bevel faces 61 engaging the inner ends 62 of the levers 50. The adjusting member 59 is provided with slots 63, which are engaged by the ends 64 of the springs 65, which are supported by the studs 66, which are suitably fastened in the groove 49 of the sleeve 39. The spring 65 is retained on the stud 66 by the washer 67, which in turn is retained by the cotter pin 68.

The pedal 69 is suitably mounted on and connected with the shafts 70, which are in turn suitably connected to and support the yoke member 71, the pedal 69 being located on the outside of the clutch housing 24 in the conventional manner as employed in motor vehicles. The shafts 70 are suitably supported in bearings carried on opposite sides of the clutch housing 24. The yoke member 71 is provided with a pair of arms 72, which extend upwardly on each side of the shaft 12 and are provided with the rounded extension portions 73 which engage the rear face of the reservoir assembly B. The reservoir assembly B comprises the two housing members 74 and 75 which are fastened together by the screws 76 and the nuts 77. A gasket member 78 may be interposed between the housing members 74 and 75 to prevent leakage of liquid. The housing member 74 may have a portion 79 which extends to a point in close proximity to the shaft 12 and thus further retains lubricant within the reservoir assembly B. The bearing assembly 80 has a race member 81 supported on the sleeve member 39 and a race member 82 supported on the housing member 74. It is to be noted that the housing member 75 of the bearing assembly B extends to a point adjacent the outer diameter of the sleeve 39. The member 83 is suitably attached to the housing member 74 and is provided with the extension portions 84, which are engaged by the inner ends of the extension portions 73 of the yoke member 71. It is to be noted that the yoke member 71 will thus retain the member 83 together with the housing members 74 and 75 from turning, this in turn holding stationary the race member 82, which is pressed onto the shoulder of the portion 79 of the housing member 74. The race member 81 is pressed onto the shouldered portion of the sleeve member 39, thus permitting the bearing assembly 80 to take the necessary thrust from the yoke member 71 when the clutch is operated to its released position, the bearing race 81 being adapted to revolve with the total clutch assembly. A reservoir of lubricant can be mounted in the lower portion of the reservoir assembly B, which will provide lubrication for the bearing assembly 80, the lubricant being maintained at a sufficient height to contact with the race member 81. The member 85 surrounds the shaft 12 and may be made of felt, cork or other suitable substance, so that, when slightly compressed between the end of the sleeve member 39 and the portion 79 of the housing member 74, the lubricant will be prevented from escaping past the portion 79, the member 85 being also slightly compressed against the shaft 12. The sleeve member 39 is provided with the threaded member 86 which is adapted to contact the end of the extension portion of the cover member 27, thus providing a stop for the forward travel of the sleeve member 39 during the movement of the sleeve during the operation of releasing the clutch. The sleeve member 39 is provided with a bearing portion 87, which engages the shaft 12 and thus provides additional support for the sleeve member 39. Suitable passages may be provided, if desired, in the portion 87 of the sleeve member 39 to enable more lubricant to be guided to the engaging surfaces of the shaft 12 and the bearing portion 87 of the sleeve member 39, if the seepage around the member 85 is not sufficient. The reserve of lubricant in the reservoir assembly B may be replenished by means of the pipe member 89 which is retained in the clutch housing 24 by the nuts 90. At the upper end of the pipe member 89 an oil cup 91 may be mounted. When the sleeve member 39 together with the reservoir assembly B is in its released position, the mouth portion 92 of the reservoir assembly B will be in line with the lower end of the pipe member 89, thus permitting lubricant which is placed in the oil cup 91 to be conducted into the reservoir assembly B. The member 88, also constructed of felt, cork or other suitable material, is assembled between the housing member 75 and the race member 81, the member 88 encircling the sleeve 39, thus preventing the escape of lubricant around and along the sleeve 39. The thrust member 15 is provided with suitable slots 93 which engage the pins 94 which thus provide means by which the thrust member 15 is driven by the flywheel 1.

It is to be noted that, when the clutch is in its released position as shown in Fig. 2, the clearance space 95 will exist between the friction face 8 of the flywheel 1 and the face of the friction member 13. Also, the clearance space 96 will exist between the front face of the thrust member 15 and the face of the friction member 14. Whenever the friction members 13 and 14 become worn to a certain extent, it would be necessary in the usual design of clutches to provide adjusting means whereby the thrust member 15 can be adjusted to a close position to the friction members 13 and 14. However, in my invention, whenever the pedal 69 is depressed to cause the extension portions 73 of the yoke member 71 to engage the rear face of the reservoir assembly B, thus causing the sleeve member 39 to move toward the friction members 13 and 14, the groove 49 of the sleeve member 39 will engage the ends 48 of the levers 47, which will cause the ends 46 of the levers 47 to engage the plates 43, this in turn causing the thrust member 15 to be moved rearwardly from the friction members 13 and 14 to the released position as shown in Fig. 2. As soon as the operator releases the pedal 69 from its depressed position, the springs 31 will cause the thrust member 15 to move toward the friction members 13 and 14, thus moving the friction members 13 and 14 and the thrust member 15 to their engaged positions, which is shown in Fig. 1. Whenever wear takes place on the faces of the friction members 13 and 14, the springs 31 will tend to move the thrust member 15 to a position nearer to the friction face 8 of the flywheel 1, which in the usual type of clutch will necessitate manual adjustment means to compensate for this wear on the friction members 13 and 14 or it will necessitate manual adjustment means, connected with the pedal 69, to move the pedal 69 to its initial starting position when the clutch is in its engaged position. Otherwise the pedal 69 would be continually changing its position when the clutch is in its engaged position, which would change the position of the pedal 69 for the operator, which in turn would soon cause the pedal 69 to interfere with adjacent parts of the motor vehicle, thus losing the available movement of the pedal 69.

In my invention, when the thrust member 15 has been returned to an operatively engaged position with the friction members 13 and 14, the slight change in position of the actuating levers 47, which will be occasioned by the wear on the face of the friction members 13 and 14, will be compensated for by the lever 50 on which the levers 47 are pivotally mounted, the ends 62 of the levers 50 being always held in engagement with the bevel faces 61 of the adjusting member 59 by the thrust of the end 64 of the spring 65. It will thus be noted that the adjusting member 59 will thus cause the levers 50 to always ride up the bevel faces 61 of the adjusting member 59 to take up the wear clearance of the friction members 13 and 14 by slightly moving the pivoted point of the levers 47, said pivoted point being constituted by the pins 51. It is to be especially noted that with this take-up clearance mechanism very minute clearances between the friction members 13 and 14 and their engaged members as occasioned by the wear of the friction members 13 and 14 will be constantly and continuously taken up, the automatically operating clearance takeup mechanism as constituted by the adjusting member 59, the levers 50 and 47 being continually adjusted to compensate for such wear in the friction members 13 and 14. The pressure of the springs 31 may be located radially around the outer portion of the thrust member 15 in sufficient numbers to provide the necessary thrust load to always cause the friction disc 9 and the friction members 13 and 14 to revolve with the thrust member 15 and the flywheel 1, the friction disc 9 thus driving the clutch shaft 12 as hereinafter disclosed, the shaft 12 being suitably connected to the transmission units of the motor vehicle in which the clutch assembly is used.

The flywheel 1 is disclosed as being provided with a starting ring 97; also the bell housing 6 is provided with inspection covers 98 and 99.

It is also to be noted that the sleeve member 39 together with the reservoir asembly B and its bearing assembly 80 will all be slidably operated together as a unit by the yoke member 71 when the clutch is released, the reservoir assembly B, however, always being restrained from revolving at all times, even when the sleeve member 39 together with its ball race 81 is revolving with the cover member 27 and the flywheel 1, such as will occur when the clutch assembly is driving the motor vehicle through the various transmission elements.

The thrust member 15 may be provided with a suitable number of tapped holes 100 to permit the installation of the screws 101 and the washers 102 for holding the thrust member 15 in assembly with the baffle members 32, the springs 31 and the cover member 27 for shipment purposes. The screws 101 may be thus used in suitable quantities as will permit the total clutch assembly to be easily handled. As soon as the total clutch assembly is mounted in the flywheel 1, the screws 101 together with the washers 102 are then removed, thus permitting the springs 31 to actuate the thrust member 15 to its normal engaged position with the friction member 14.

It is also to be noted that the end 46 of the lever 47 will be slidably mounted as well as permitting of a pivotal movement within the arched chamber formed by the bosses 42 being closed at their outer ends by the plate 43.

It is also to be noted that the levers 47 and 50, as disclosed in Fig. 2, which shows the released position of the clutch, will show a slightly different relationship than in Fig. 1, in which the clutch is disclosed as being fully engaged, the slightly different relationship representing the automatically adjusted operating movement which has taken place due to the adjusting member 59 always being maintained in engagement with the end 62 of the lever 50.

In order to eliminate objectionable gear rattles and noises in the various transmission units of an automotive vehicle, the driven member assembly A is provided with vibration dampening mechanism. This is accomplished by the hub 10 being provided with a flange member 103, the hub 10 being suitably machined to fit the splines 104 of the shaft 12. The flange member 103 of the hub 10 is provided with angular surfaces 105 which tend to converge toward the center of the hub 10. The angular surfaces 106 are oppositely disposed from the angular surfaces 105 relative to the flange member 103. The angular surfaces 105 may be separated by a flat surface 107 and the angular surfaces 106 may be separated by a flat surface 108, the flat surfaces 107 and 108 being also angularly disposed relative to the vertical plane of the friction engaging surfaces of the friction disc 9. The vibration dampening members 109 and 110, which are made of rubber composition or similar material, are formed with similar angular faces 121 which engage the above mentioned angular surfaces 105 and 106 of the flange member 103. The friction disc 9 is also formed with angular faces 111, which engage the outside angular faces 121 of the vibration dampening member 110. To maintain the vibration dampening members 109 and 110 in close engagement with the flange member 103, the cover member 112 is provided with angular surfaces 113 which engage the angular faces 121 of the vibration dampening member 109, the cover member 112 being maintained in this position by being fastened to the friction disc 9 by the rivets 114, the cover member 112 and the disc 9 forming an annular chamber for containing and enclosing the vibration dampening members 109 and 110, and the flange 103. It will thus be seen that, as the friction disc 9 will thus cause its driving torque to be transmitted through the cover member 112 together with its own central disc portion, which is fastened to the cover member 112 by the rivets 114, to the vibration dampening members 109 and 110 and from said vibration dampening members to the flange member 103 of the hub 10, the vibration dampening members 109 and 110 will have a torque load imposed upon them by the angular surfaces 113 of the cover member 112 and by the angular surfaces 111 of the friction disc 9, the vibration dampening members 109 and 110 further transmitting the torque reactions through their angular surfaces 121 which engage the angular surfaces 105 and 106 of the flange member 103. It is to be noted that the angular surfaces 121 of the vibration dampening member have a greater wall thickness than the portions 122 connecting the angular surfaces. In this way, a greater amount of vibration dampening material is provided to withstand the torque reactions against the angular surfaces of the cover member 112, the disc 9 and the flange member 103. The angular surfaces above mentioned and the various parts as above mentioned will thus absorb the driving torque and, due to the enclosing construction, the various members with their angular surfaces will be maintained in contact with the vibration dampening members 109 and 110, which will thus, due to their resilient characteristic, absorb any shock loads and will form, further, a deadening member between the motor and the gears of the transmission unit.

It is to be noted that the vibration dampening members 109 and 110 will be restrained from flowing outwardly from the axis of the clutch by the cover member 112 and the disc 9 extending around the peripheries of the vibration dampening members 109 and 110.

It is also to be noted that the total frictional area of the sides of the flange 103 and the vibration dampening members 109 and 110 will be conserved and adapted to engage frictionally, this being accomplished by locating the rivets 114, which constitutes securing means, outwardly from and beyond the peripheries of the flange 103 and the vibration dampening members 109 and 110, the vibration dampening members each being thus only provided with a single aperture to permit assembly over the hub 10.

To further improve the operation of the cluch by permitting easy and gradual engagement of the friction disc 9 together with its friction members 13 and 14 when engaging the friction face 8 of the flywheel 1 and the thrust surface of the thrust member 15, the friction disc 9 is provided with a series of openings 115 which are again fully covered on both sides of the friction disc member by the friction members 13 and 14 when they are riveted or otherwise attached to the friction disc 9. It will thus be seen that a small compartment is formed by the opening 115 within the friction disc 9 by the friction members 13 and 14. In the openings 115 are assembled spreading members 116 which are formed with a central portion 117 having a series of arms 118 extending therefrom. In its normal position the central portion 117 is displaced from the arms 118 as shown in Fig. 13, the portion 117 being displaced on the opposite side of the friction disc 9 from the arms 118. It will thus be seen that, when the spreading member 116 is assembled between the friction members 13 and 14 and within the opening 115, the oppositely disposed off-set portions of the spreading member 116 will tend to bulge the friction members 13 and 14, as shown at 119 and 120, Fig. 12. It is to be noted that the bulged portions 119 will tend to be located approximately central with the displaced central portion 117 of the spreading members 116, whereas the bulged portions 120 will tend to be located opposite the displaced arm portions 118 of the spreading member 116. It will thus be seen that the bulged portions 119 and 120 of the completely assembled driven member assembly A will thus provide portions that will engage the thrust surfaces of the thrust member 15 and the friction face 8 of the flywheel 1 before the main portions of the friction members 13 and 14 become fully engaged with the above mentioned thrust surfaces. This will provide a very easy and gradual engagement of the friction members 13 and 14. It has been found from considerable experience with this type of spreading member 116 that it provides a very simple and successful means of securing gradual engagement of any kind of flexible member such as the friction members 13 and 14 with surfaces to be engaged.

It is to be further noted that the outside diameter of the flange member 103 of the hub 10 is piloted within the offset shouldered portions of both the friction disc 9 and the cover member 112, thus permitting the friction disc 9 and the hub 10 and its flange member 103 to be always located and maintained concentrically.

I claim:

1. In a driven member, the combination of a flange provided with a series of oppositely disposed angular surfaces converging toward the center of said flange, deformable members engaging the oppositely disposed angular surfaces of said flange, and members each provided with a series of angular surfaces converging toward the center of said members, the angular surfaces of said last mentioned members wedging said deformable members between the angular surfaces of said flange.

2. In a rotating driven member, a vibration dampening member provided with a series of load receiving surfaces, the load receiving surfaces of said vibration dampening member increasing in effective area as they are increasingly removed from the center of rotation of said vibration dampening member, the load receiving surfaces of said member being restrained from flowing radially outwardly.

3. In a driven member for a clutch, the combination of a member provided with a frictional face, a cover member suitably mounted on said first mentioned member, and a resiliently mounted member between said first mentioned member and said cover member, said resiliently mounted member being provided with a surface extending entirely around its peripheral portion for locating said first mentioned member together with said cover member, said resiliently mounted member having its outside diameter contacting said first mentioned member and said cover member.

4. In a driven member for a clutch, a pair of members suitably connected to form an annular chamber therebetween, each of said pair of members being provided with a series of offset angular converging portions extending into said annular chamber, the offset angular converging portions of one of said pair of members being located between the offset angular converging portions of the other of said pair of members.

5. In a clutch, the combination of a member provided with a hub having a flange having its wall portions offset to form angularly disposed driving surfaces alternately located on each side of the center of said flange, flexible cushioning members having their wall portions offset to form angularly disposed driving surfaces for engaging the angularly disposed driving surfaces of said hub located alternately on each side of the center of said flange, and means for fastening said flexible cushioning members against the flange of said hub.

6. In a clutch, the combination of a member having a flange provided with a plurality of angularly disposed driving surfaces formed by offsetting the wall portion of said flange, said driving surfaces converging toward the center of said member, flexible cushioning members engaging the angularly disposed driving surfaces of said member, said flexible cushioning members being open at the outer ends of its portions contacting the angularly disposed driving surfaces of the flange of said member, and means for securing said flexible cushioning members to the flange of said member, said means enclosing the open outer ends of the portions of said flexible cushioning members, contacting the angularly disposed driving surfaces of the flange of said member, to prevent said flexible cushioning members from flowing out over the ends of the angularly disposed driving surfaces of the flange of said member, said means comprising fastening members located outside of the outer extremities of the open outer ends of the portions of said flexible cushioning members contacting the angularly disposed driving surfaces of the flange of said member.

7. In a clutch, the combination of a driven member provided with a flange having angularly disposed driving surfaces thereon, said flange being provided with a peripheral portion formed with a single continuously extending diameter, said flange having substantially the same cross section throughout its peripheral portion including its angularly disposed driving surfaces, flexible cushioning members contacting the angularly disposed driving surfaces of the flange of said driven member, and means for securing said driven member and said flexible cushioning members together, said means being located outside of the peripheries of said flange and said flexible cushioning members.

8. In a clutch, the combination of a hub provided with a flange having driving surfaces converging toward the center of said hub, said driving surfaces extending angularly relative to the axis of said hub, said driving surfaces being connected by a portion of the flange extending angularly relative to a vertical plane located at right angles to the axis of said hub, flexible cushioning members engaging the driving surfaces of the flange of said hub, and means for securing said flexible cushioning members in contact with the flange of said hub, said means being located outside of the peripheries of said flange and said flexible cushioning members.

9. In a clutch, the combination of a disc member provided with frictional members, said disc member being provided with angular load receiving surfaces converging toward the axis of said disc member, a hub member provided with a flange having angular load receiving surfaces converging toward the axis of said hub member, resilient dampening members between said angular surfaces of said disc member and the angular surfaces of the flange of said hub member, a cover member provided with angular surfaces converging toward the center of said cover member, resilient dampening members between the angular surfaces of the flange of said hub member and the angular surfaces of said cover member, and means for securing said cover member to said disc member, said means being radially located outside of said resilient dampening members.

10. In a clutch, a vibration dampening member provided with a plurality of portions having peripheral edges extending in a plurality of parallel planes, said portions being connected by angular positioned portions, said angular positioned portions having a greater cross sectional area than said first mentioned portions.

11. In a clutch, the combination of a member having a flange provided with converging angular surfaces connected by angularly disposed surfaces alternately located on opposite sides of the center of the flange of said member, an enclosing member having converging angular surfaces, and flexible cushioning members between said first mentioned and said second mentioned members, said flexible cushioning members being provided with converging angular surfaces.

12. In the driven element of a clutch, the combination of a hub member provided with a continuous flange extending therearound the continuous flange of said hub member being provided with a series of oppositely disposed and alternately displaced offset portions connected at their peripheral portions, deformable members oppositely disposed about the continuous flange of said hub member, said deformable members being provided with oppositely disposed and alternately displaced offset portions engaging said offset portions of the flange of said hub member, and means for maintaining said resilient members in contact with the continuous flange of said hub member, said means comprising a pair of flange portions located adjacent one another and suitably secured together at their adjacent portions.

13. In the driven element of a clutch, the combination of a member provided with a flange having surfaces extending approximately at right angles to the axis of said member, deformable members located on opposite sides of and engaging the surfaces of said flange, extending approximately at right angles to the axis of said member, said deformable members extending continuously around said member and being separated throughout their total adjacent areas from contact with each other by said flange, means enclosing said deformable members together with the flange of said first mentioned member, and members for securing said last mentioned means, sa'd members being located outwardly beyond the peripheral portions of said deformable members.

14. In a driven member of a clutch, the combination of a hub provided with a flange having irregular shaped surfaces oppositely disposed about said flange and extending radially from said hub, deformable members extend ng continuously around said hub and having their total adjacent areas engaging said irregular shaped surfaces on the flange of said hub, and means for imposing driving loads on said deformable members, said last mentioned means enclosing said deformable members.

15. In a driven member, the combination of a member provided with a hub having a continuous flange extending around the hub, and a pair of deformable members extending continuously around said first mentioned member, said pair of deformable members being oppositely disposed about the continuous flange of said first mentioned member, said deformable members each being provided with a single aperture, said pair of deformable members being separated from contact with one another by said contact flange.

16. In a driven member, the combination of a flange provided with oppositely disposed angular surfaces and a pair of deformable members provided with angular surfaces engaging the angular surfaces of said flange to eliminate vibration, each of said deformable members being provided with a single aperture only, said pair of deformable members being separated from contact with one another throughout their total adjacent areas.

17. In a driven member for a clutch provided with deformable members, a hub member having a flange provided with a series of angularly positioned load thrust surfaces located between the planes of its outer side surfaces, said angularly positioned thrust surfaces being alternately located on opposite sides of said flange, said flange having the total area of its side surfaces adapted to contact the deformable members of the clutch.

18. In a driven member for a clutch, the combination of a member provided with a frictional surface having angularly positioned portions, a cover member provided with a frictional surface having angularly positioned portions, said first mentioned member and said cover member forming an annular chamber, a pair of deformable members enclosed within said annular chamber, and driven means engaging said pair of deformable members, said driven means extending within said annular chamber.

19. In a driven member, a vibration absorbing member provided with a series of angular load receiving portions together with connecting portions between said angular load receiving portions of said v.bration absorbing member, said angular load receiving portions having a greater thickness than the thickness of the connecting portions of said vibration absorbing member, said connecting portions being alternately displaced on each side of the normal center of said vibration absorbing member, said normal center extending in a plane at right angles to the axis of said vibration absorbing member.

20. In a driven mechanism for a clutch, a driven member provided with a flange portion having a series of converging angular surfaces together with a series of converging flat surfaces between the converging angular surfaces of said driven member, said driven member being provided with a single aperture only extending therethrough.

JOHN W. TATTER.